US007256988B2

(12) United States Patent
Shimamoto et al.

(10) Patent No.: US 7,256,988 B2
(45) Date of Patent: Aug. 14, 2007

(54) INFORMATION PROCESSING APPARATUS HAVING SWITCH FOR INPUTTING KEY DATA

(75) Inventors: Hajime Shimamoto, Ome (JP); Satoshi Araki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/942,108

(22) Filed: Sep. 16, 2004

(65) Prior Publication Data

US 2005/0063149 A1    Mar. 24, 2005

(30) Foreign Application Priority Data

Sep. 19, 2003   (JP)   ............................. 2003-327693

(51) Int. Cl.
*G06F 1/16*   (2006.01)
(52) U.S. Cl. ...................... 361/683; 361/681; 345/168
(58) Field of Classification Search ................. 361/683
See application file for complete search history.

(56) References Cited

U.S. PATENT DOCUMENTS

| 5,644,113 | A | 7/1997 | Date et al. | |
|---|---|---|---|---|
| 5,719,799 | A * | 2/1998 | Isashi ........................ | 708/105 |
| 6,198,626 | B1 | 3/2001 | Nakajima et al. | |
| 6,243,258 | B1 * | 6/2001 | Paratore ..................... | 361/680 |
| 6,850,226 | B2 * | 2/2005 | Finke-Anlauff ............. | 345/169 |
| 7,016,183 | B2 * | 3/2006 | Takemoto et al. .......... | 361/683 |
| 2002/0181722 | A1 | 12/2002 | Hibino et al. | |
| 2003/0045355 | A1 | 3/2003 | Cornair | |
| 2003/0137802 | A1 * | 7/2003 | Von Novak ................. | 361/680 |
| 2003/0202320 | A1 * | 10/2003 | Agata et al. ................ | 361/683 |
| 2003/0206394 | A1 * | 11/2003 | Ossia ......................... | 361/680 |
| 2004/0027793 | A1 * | 2/2004 | Haraguchi et al. .......... | 361/683 |
| 2004/0075973 | A1 * | 4/2004 | Makela ....................... | 361/683 |
| 2004/0174666 | A1 * | 9/2004 | Brandenberg et al. ...... | 361/680 |
| 2004/0222965 | A1 * | 11/2004 | Riccomini et al. .......... | 345/156 |
| 2005/0012723 | A1 * | 1/2005 | Pallakoff ..................... | 345/173 |

FOREIGN PATENT DOCUMENTS

| EP | 0 909 616 A1 | 4/1999 |
|---|---|---|
| WO | WO 03/019466 | 3/2003 |

OTHER PUBLICATIONS

European Search Report dated Dec. 16, 2006 for Appln. No. 04020386.1-1527.
"User Manual of Nokia 9000i Communicator Issue 2 En" Jul. 7, 1998, Nokia Mobile Phone Ltd. XP002409380, p. 1.1; p. 2.6; p. 2.7; p. 2.10; p. 2.11; figure 1.2; 2.9; 2.11.
"User Guide PSION "Series 3C" Version 1.0 English", Aug. 1996; PSION PLC; p. 5,6; XP002409381.

* cited by examiner

*Primary Examiner*—Anatoly Vortman
*Assistant Examiner*—Anthony Q. Edwards
(74) *Attorney, Agent, or Firm*—Pillsbury Winthrop Shaw Pittman, LLP (57) ABSTRACT

An information processing apparatus includes a housing with a top surface and a rear surface, a CPU (central processing unit) provided in the housing, a keyboard placed on the top surface of the housing and including a plurality of keys which input key data to the CPU, a display unit attached to the housing rotatably between a closed position in which the display unit covers the keyboard and an open position in which the keyboard is exposed, and at least one switch provided on the rear surface of the housing and configured to input key data to the CPU.

2 Claims, 9 Drawing Sheets

FIG. 14

INFORMATION PROCESSING APPARATUS HAVING SWITCH FOR INPUTTING KEY DATA

CROSS-REFERENCE TO RELATED APPLICATIONS

This application is based upon and claims the benefit of priority from prior Japanese Patent Application No. 2003-327693, filed Sep. 19, 2003, the entire contents of which are incorporated herein by reference.

BACKGROUND OF THE INVENTION

1. Field of the Invention

The present invention relates to an information processing apparatus such as a portable computer.

2. Description of the Related Art

Various portable computers such as notebook personal computers have recently been developed. Most of the portable computers are configured in consideration of their operability when they are used on a desk or a user's lap. All key switches of a keyboard are therefore arranged on the top surface of the housing (disclosed in, e.g., U.S. Pat. No. 6,198,626B1).

In the above portable computers used on a desk or a user's lap, a user can operate a keyboard by touch-typing with both hands. In most portable computers such as hand-held computers, however, a user operates a keyboard while holding a computer with both hands. The user often depresses keys of the keyboard chiefly with both thumbs. In some computer key operations, a user has to depress two or more keys at once; however, it may be difficult for the user to depress the keys only with both thumbs.

BRIEF SUMMARY OF THE INVENTION

According to an embodiment of the present invention, there is provided an information processing apparatus comprising a housing with a top surface and a rear surface, a CPU (central processing unit) provided in the housing, a keyboard placed on the top surface of the housing and including a plurality of keys which input key data to the CPU, a display unit attached to the housing rotatably between a closed position in which the display unit covers the keyboard and an open position in which the keyboard is exposed; and at least one switch provided on the rear surface of the housing and configured to input key data to the CPU.

According to another embodiment of the present invention, there is provided An information processing apparatus comprising a housing with a top surface and a rear surface, a CPU (central processing unit) provided in the housing, a keyboard placed on the top surface of the housing and including a plurality of keys which input key data to the CPU, a display unit supported by the housing and having a rear surface and a front surface on which a display screen is placed, the display unit being set in one of a first position in which the display screen and the keyboard are exposed and a second position in which the rear surface of the display unit covers the keyboard while the display screen is exposed, and at least one switch provided on the rear surface of the housing and configured to input first key data to the CPU if the display unit is set in the first position and input second key data to the CPU if the display unit is set in the second position.

According to still another embodiment of the present invention, there is provided an information processing apparatus comprising a housing with a top surface and a rear surface, a CPU (central processing unit) provided in the housing, a keyboard placed on the top surface of the housing and including a plurality of keys which input key data to the CPU, a display unit attached to the housing rotatably between a closed position in which the display unit covers the keyboard and an open position in which the keyboard is exposed, and a switch provided on the rear surface of the housing and configured to supply the CPU with key data which is equal to any one of a plurality of key data items corresponding to the plurality of keys.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the present invention will now be described with reference to the accompanying drawings.

Figure 1:
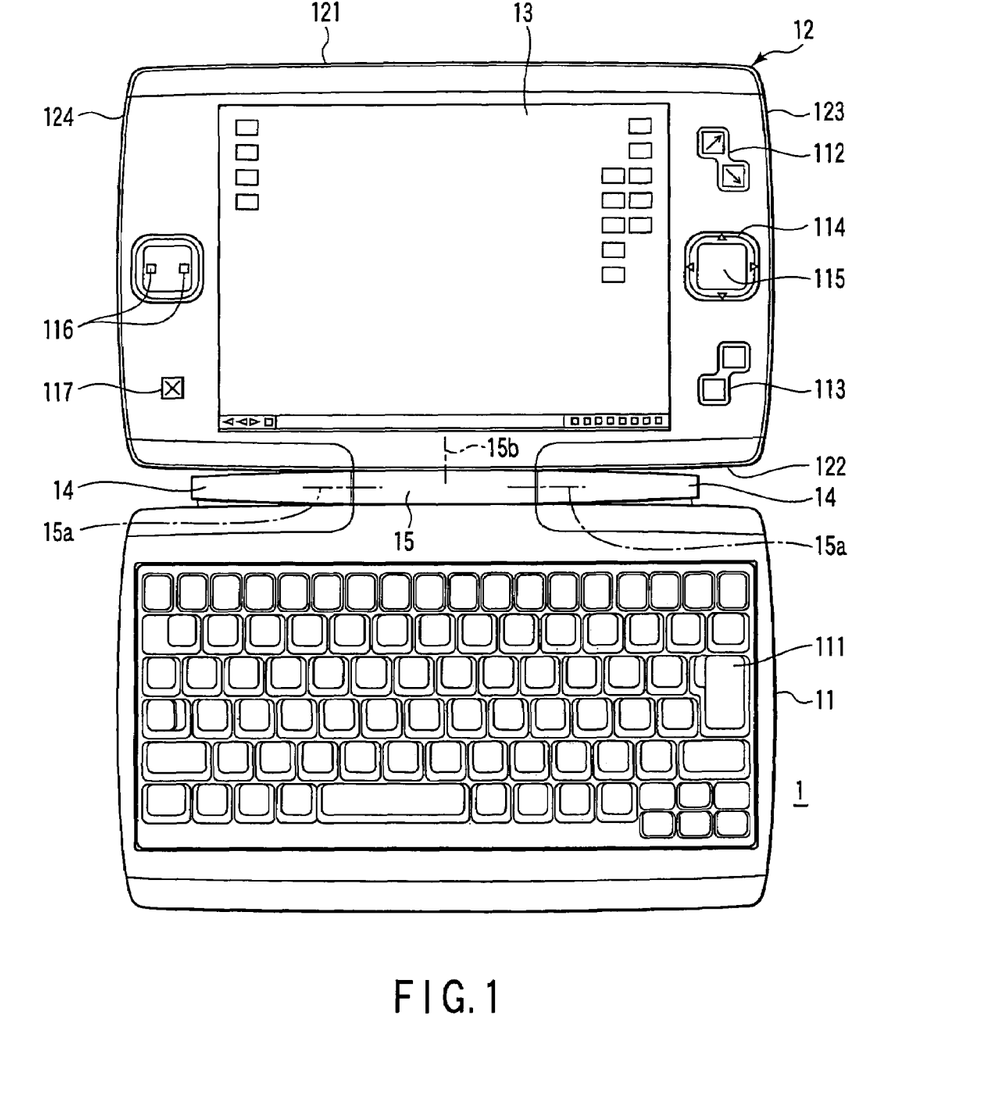
FIG. 1 is an external view of an information processing apparatus according to an embodiment of the present invention.

FIG. 1 shows an outward appearance of an information processing apparatus according to an embodiment of the present invention. The information processing apparatus is implemented as a hand-held portable personal computer 1 that is much smaller than a notebook personal computer.

The portable personal computer 1 includes a computer main body 11 and a display unit 12. The computer main body 11 is configured by a thin, rectangular box-type housing. The housing contains different electronic components that make up a portable personal computer, such as a CPU (Central Processing Unit), a memory, a chip set and a hard disk drive. The housing includes a rectangular case with an opening at the top and a cover joined to the case so as to cover the opening of the case. A keyboard placement area is formed on the top surface of the housing, or the top surface of the computer main body 11. A keyboard 111 is placed on the keyboard placement area. The keyboard 111 is a key set including a plurality of keys (key switches) for inputting key data to the CPU. The computer main body 11 has a pair of hinges 14 at the rear end. The hinges 14 are parts for supporting the display unit 12.

The display unit 12 includes a thin, rectangular display unit main body with a top-end portion 121, a bottom-end portion 122, a right-end portion 123 and a left-end portion 124. A flat panel display unit, e.g., an LCD (Liquid Crystal Display) 13 is mounted on the front of the display unit main body such that its display screen can be exposed. The display screen of the LCD 13 is located almost in the center of the display unit 12. The LCD 13 is implemented as a touch screen device that is capable of recognizing a position indicated by a stylus (pen) or a user's finger.

A support member 15 is attached to the center of the bottom-end portion 122 of the display unit main body. The hinges 14 support the support member 15 such that the display unit 12 rotates around a first central axis 15a that extends in parallel to the outer surface of the computer main body 11. Thus, the display unit 12 is supported rotatably between an open position (a first open position shown in FIG. 1) in which the entire top surface of the computer main body 11 and the display screen of the LCD 13 are exposed and a closed position in which the front of the display unit main body covers the entire top surface of the computer main body 11.

Figure 2:
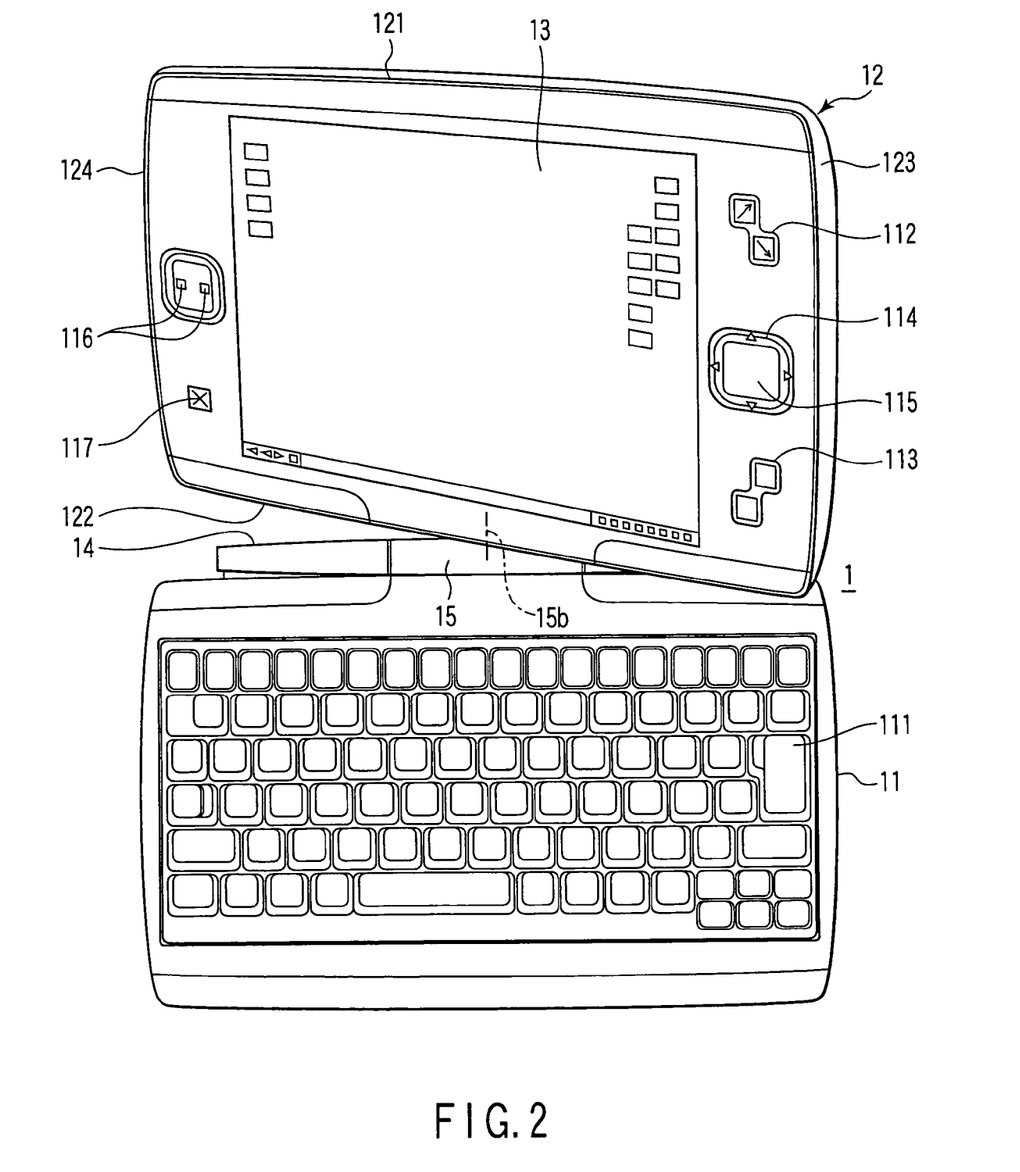
FIG. 2 is an external view of the information processing apparatus shown in FIG. 1, the display unit of which rotates in a horizontal direction.
Figure 5:
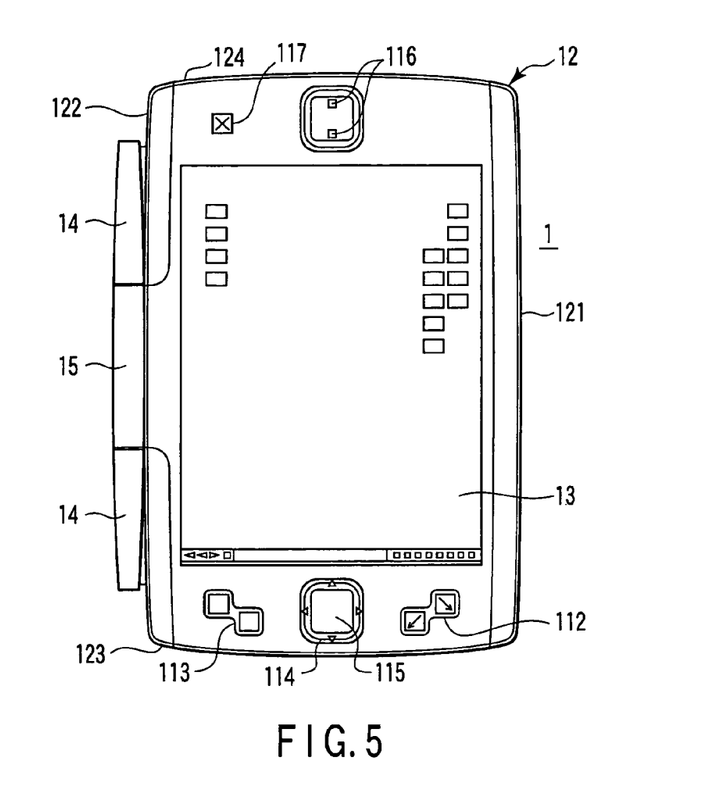
FIG. 5 is a top view of the information processing apparatus shown in FIG. 1, which is set in a PDA style.

The support member 15 supports the display unit main body such that the display unit 12 rotates around a second central axis 15b that extends to the display unit main body from the support member 15 in a direction perpendicular to the first central axis 15a. Thus, the display unit 12 can rotate 360 degrees around the second central axis 15b in a horizontal direction with respect to the outer surface of the computer main body 11, as illustrated in FIG. 2. The display unit 12 rotates 180 degrees around the second central axis 15b in a horizontal direction (the front and rear surfaces of the display unit main body change places) and then is set in the closed position, with the result that it can be placed in the second open position as shown in FIG. 5. In the second open position, the display screen of the LCD 13 is exposed and the rear surface (back) of the display unit main body covers the entire top surface of the computer main body 11.

When the display unit 12 is set in the first open position (FIG. 1), a user can use the computer 1 in the same style as that of a normal notebook personal computer (referred to as a PC style). In this PC style, the user can operate the keyboard 111 while seeing the display screen of the LCD 13. On the other hand, when the display unit 12 is set in the second open position (FIG. 5), the user can use the computer 1 in the same style as that of normal PDA (Personal Digital Associates) with a main body and a display unit built in the main body (hereinafter referred to as a PDA style). In this PDA style, the user can input information with the stylus or operate various key switches provided on the display unit main body.

As shown in FIG. 1, a pair of key switches 112, another pair of key switches 113 and a key switch 114 are arranged on the right front of the display unit main body. The key switches 112 are, for example, push button switches serving as zoom keys for scaling an image (screen image) such as text and graphics displayed on the display screen of the LCD 13. The key switches 113 are, for example, push button switches serving as keys for starting a specific application program. The key switch 114 is a cross key switch including four arrow keys indicating four directions of up, down, right and left. The key switch 114 has a touch panel 115 serving as a pointing device in its inside area.

Further, a pair of key switches 116 and a key switch 117 are arranged on the left front of the display unit main body. The key switches 116 are, for example, push button switches serving as a right button (cancel key) and a left button (enter key) of the pointing device. The key switch 117 is a push button switch serving as an inhibit switch for inhibiting an automatic image rotating function from being fulfilled to automatically vary the orientation of an image displayed on the display screen of the LCD 13. The automatic image rotating function is used to align the orientation of the image with a correct one relative to the force of gravity. When the inhibit switch 17 turns on, it outputs an event signal (e.g., signal of logic level "1") indicative of inhibition of the automatic image rotating function. While the inhibit switch 117 is in on state, the orientation of the image displayed on the display screen of the LCD 13 is not varied whichever orientation the display unit main body rotates relative to the force of gravity. On the other hand, when the inhibit switch 117 turns off, it outputs an event signal (e.g., signal of logic level "0") indicative of permission to perform the automatic image rotating function. While the inhibit switch 117 is in off state, when the display unit main body rotates relative to the force of gravity, the orientation of the image displayed on the display screen of the LCD 13 automatically varies, thus the orientation of the image is aligned with a correct orientation relative to the force of gravity.

Figure 3:
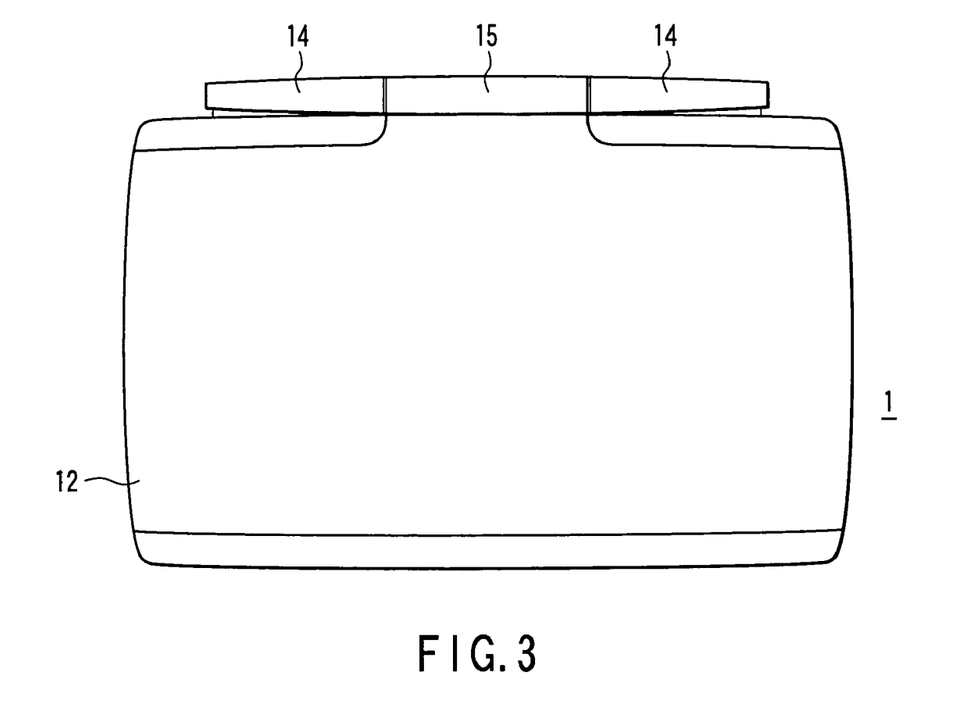
FIG. 3 is a top view of the information processing apparatus shown in FIG. 1, the display unit of which is closed.
Figure 4:
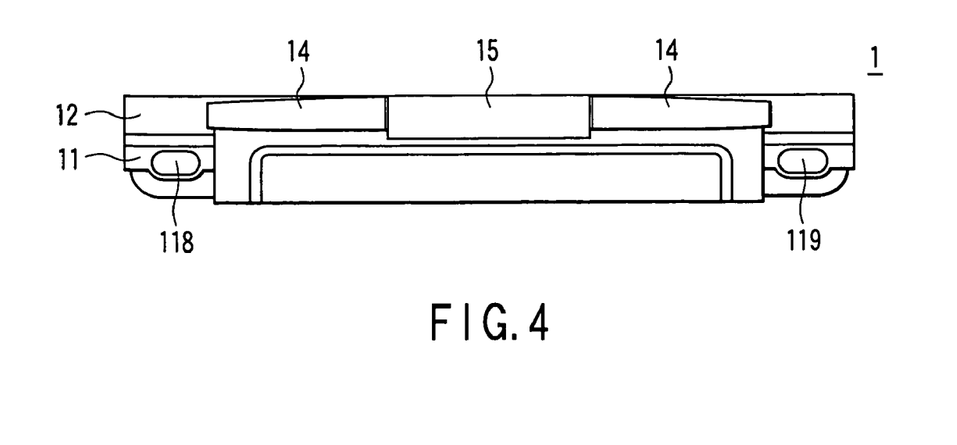
FIG. 4 is a rear view of the information processing apparatus shown in FIG. 1, the display unit of which is closed.

FIG. 3 is a top view of the computer 1 whose display unit main body is located in the closed position. FIG. 4 is a rear view of the computer 1 shown in FIG. 3.

Referring to FIG. 4, two key switches 118 and 119 are arranged on the back of the computer main body 11. The key switch 118 is a push button switch provided on the right-end portion of the back of the computer main body 11 when viewed from the front of the body 11. It is referred to as an R (right) button switch hereinafter. The key switch 119 is a push button switch provided on the left-end portion of the back of the computer main body 11 when viewed from the front of the body 11. It is referred to as an L (left) button hereinafter.

Any given function can programmably be assigned to each of the R and L button switches 118 and 119. In the computer 1, the R and L button switches 118 and 119 serve as key switches for inputting given key data (key code) to the CPU, like the key switches of the keyboard 111. The R and L button switches 118 and 119 are exposed regardless of whether the computer 1 is used in a PC style or a PDA style. In either case, a user can operate both the R and L button switches 118 and 119.

Figure 11:
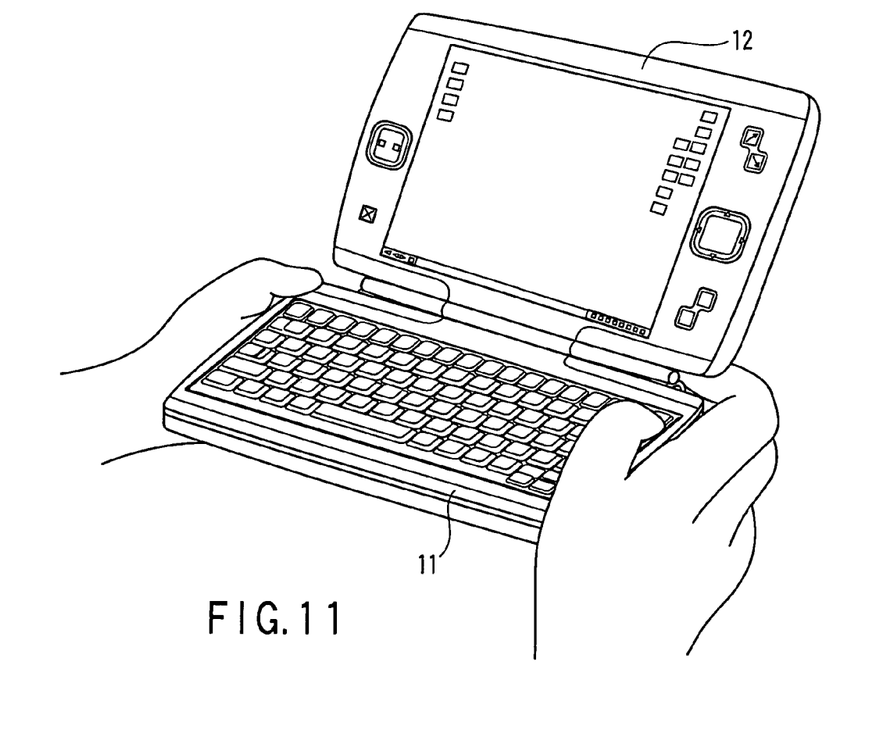
FIG. 11 is an illustration of the information processing apparatus shown in FIG. 1, which is used in a PC style.

The PC style includes a style in which a user puts the computer 1 on a desk or a user's lap and a style in which a user supports the computer 1 with both hands. In the former style, the user can perform a touch-typing operation with both hands. In the latter style as shown in FIG. 11, however, the user has to operate the keyboard 111 chiefly with thumbs. In the PC style, therefore, it is desirable to use both the R and L button switches 118 and 119 as key switches for assisting a user in operating the keyboard 111.

The R and L button switches 118 and 119 are provided on the back of the computer main body 11 as described above. A user can thus operate the keyboard 111 with thumbs while supporting the computer 1 with both hands as shown in FIG. 11 and simultaneously operate the R button switch 118 with, e.g., the right forefinger or the L button switch 119 with, e.g., the left forefinger.

For example, it is favorable that key data corresponding to an auxiliary key used in combination with other keys be assigned to each of the R and L button switches 118 and 119. The keyboard 111 includes a plurality of alphabet keys and a plurality of auxiliary keys (e.g., [Shift] key, [Ctrl] key, [Alt] key). The auxiliary keys are used in combination with (depressed simultaneously with) one or more keys such as the alphabet keys. In the present embodiment, for example, the R button switch 118 serves as a switch for inputting key data corresponding to the [Shift] key, and the L button switch 119 serves as a switch for inputting key data corresponding to the [Ctrl] key. Thus, a user can easily input key data corresponding to the alphabet keys and key data corresponding to the [Shift] key or [Ctrl] key at the same time when he or she performs a typing operation while supporting the computer 1 with both hands.

Another example of favorable key data to be assigned to the R and L button switches 118 and 119 corresponds to an arrow key. The keyboard 111 includes four arrow keys ([↑] key, [↓] key, [→] key and [←] key) corresponding to four directions of up, down, right and left. The [↑] key is an up arrow key for moving up a pointing position on the display screen of the LCD 13, and the [↓] key is a down arrow key for moving down a pointing position on the display screen of the LCD 13. If key data corresponding to the [↓] and [↑] keys are assigned to their respective R and L button switches 118 and 119, they can serve as switches for inputting the key data corresponding to the [↓] and [↑] keys. Consequently, a user can move a pointing position up and down on the display screen and scroll an image displayed thereon up and down by operating the R button switch 118 with the right forefinger and operating the L button switch 119 with the left forefinger while supporting the computer 1 with both hands.

Using dedicated utility programs, a user can previously designate which of the auxiliary keys and the arrow keys are assigned to the R and L button switches 118 and 119.

Figure 12:
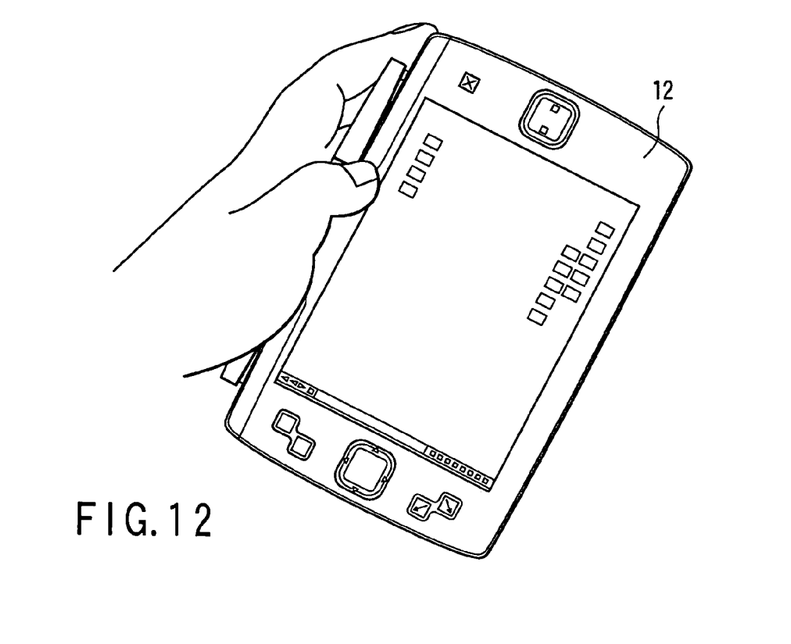
FIG. 12 is an illustration of the information processing apparatus shown in FIG. 1, which is used in a PDA style.

A user can operate both the R and L button switches 118 and 119 in the PDA style as well as in the PC style, as shown in FIG. 12. In the PDA style, the user performs an input operation chiefly with a stylus (pen) because he or she cannot operate the keyboard 11 (the keyboard 111 is covered with the rear surface of the display unit 12). It is therefore favorable that the R and L button switches 118 and 119 be used not for inputting key data to assist a user in operating the keyboard 111 but for assisting a user in performing an input operation with a stylus. In the PDA style, the R button switch 118 serves as a switch for inputting key data corresponding to the left button of the pointing device or key data corresponding to the [Enter] key, and the L button switch 119 serves as a switch for inputting key data corresponding to the right button of the pointing device or key data corresponding to the [Esc] key.

The computer 1 has a key assignment changing function of automatically changing a function assigned to each of the R and L button switches 118 and 119 according to which of the PC style and the PDA style is used for the computer 1. With this function, a key that conforms to a style to use the computer 1 can be assigned to each of the R and L button switches 118 and 119.

There now follows an explanation of an automatic image rotating function.

In the PC style (FIG. 1), a screen image such as text and graphics is set to the orientation (first orientation) in which the bottom-end portion of the screen image is located toward the computer main body 11, more specifically, the top-end portion of the screen image is located toward the top-end portion 121 of the display unit main body and the bottom-end portion of the screen image is located toward the bottom-end portion 122 of the display unit main body. The orientation of the screen image corresponds to that of a default of the image in the PC style.

When the display unit 12 opens 180 degrees or more from the closed position on the top surface of the computer main body 11 relative to the first central axis 15a, the screen image automatically rotates 180 degrees relative to the orientation of a default and its orientation is changed to an orientation (second orientation) in which the top-end portion of the screen image is located toward the computer main body 11 and, more specifically, the top-end portion of the screen image is located toward the bottom-end portion 122 of the display unit main body and the bottom-end portion of the screen image is located toward the top-end portion 121 of the display unit main body. Thus, a user can present the screen image to the partner who faces the user in a correct orientation while maintaining the keyboard 11 in its operable state, with the result that he or she can make a presentation or the like with efficiency.

In the PDA style (FIG. 5), the computer 1 is used in such a manner that the left-end portion 124 of the display unit main body is located above and the right-end portion 123 thereof is located below relative to the force of gravity. Thus, the orientation of the screen image is so controlled that the top-end portion of the screen image is located toward the left-end portion 124 of the display unit main body and the bottom-end portion of the screen image is located toward the right-end portion 123 of the display unit main body. The orientation of the screen image corresponds to that of a default of the image in the PDA style. The aspect ratio of the display screen is changed from the aspect ratio (e.g., length:wide=3:4) corresponding to a horizontally oriented screen used in the PC style to the aspect ratio (e.g., length:wide=4:3) corresponding to a vertically oriented screen.

In the PDA style, the computer 1 is able to rotate in different orientations relative to the force of gravity (FIGS. 5 to 8).

Figure 6:
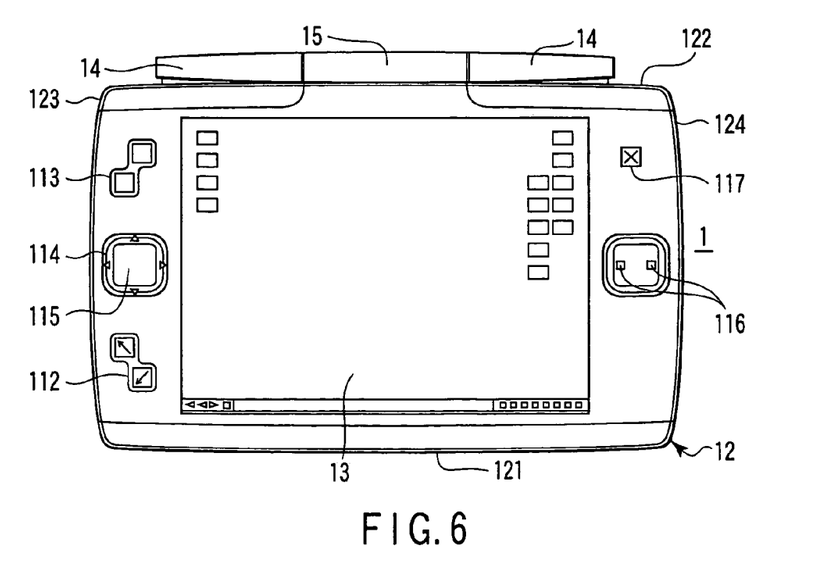
FIG. 6 is a top view of the information processing apparatus shown in FIG. 1, which turns 90 degrees to the right in a PDA style.

FIG. 6 illustrates the computer 1 in which the bottom-end portion 122 of the display unit main body is located above and the top-end portion 121 thereof is located below relative to the force of gravity. A screen image rotates 90 degrees to the left relative to the orientation of a default of the image in the PDA style such that the top-end portion of the screen image is located toward the bottom-end portion 122 of the display unit main body and the bottom-end portion of the screen image is located toward the top-end portion 121 of the display unit main. The screen image is displayed in the aspect ratio (e.g., length:width=3:4) corresponding to the horizontally oriented screen.

Figure 7:
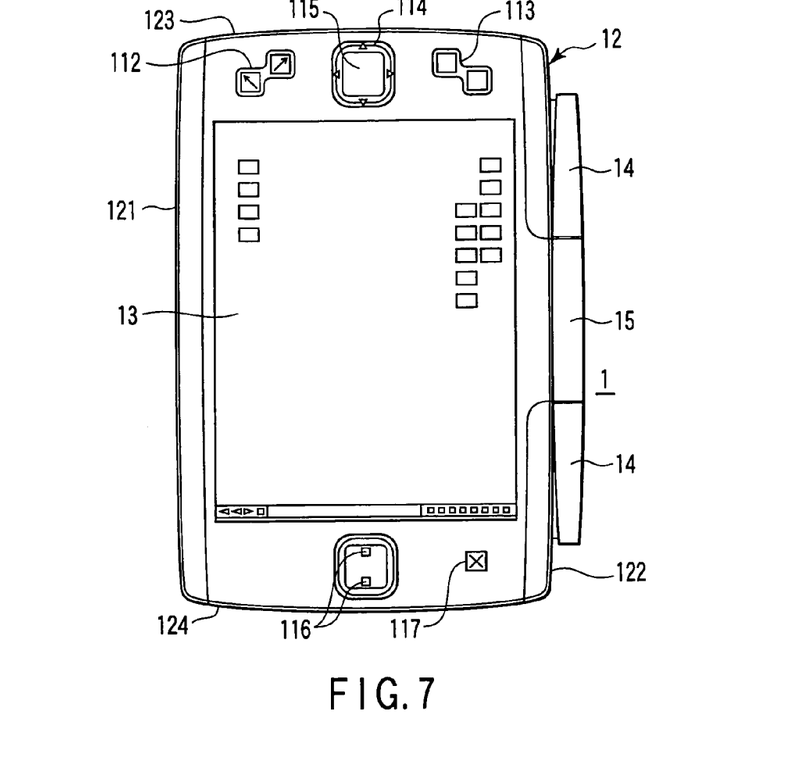
FIG. 7 is a top view of the information processing apparatus shown in FIG. 1, which turns 180 degrees in a PDA style.

FIG. 7 illustrates the computer 1 in which the right-end portion 123 of the display unit main body is located above and the left-end portion 124 thereof is located below relative to the force of gravity. A screen image rotates 180 degrees relative to the orientation of a default of the image in the PDA style such that the top-end portion of the screen image is located toward the right-end portion 123 of the display unit main body and the bottom-end portion of the screen image is located toward the left-end portion 124 of the display unit main body.

Figure 8:
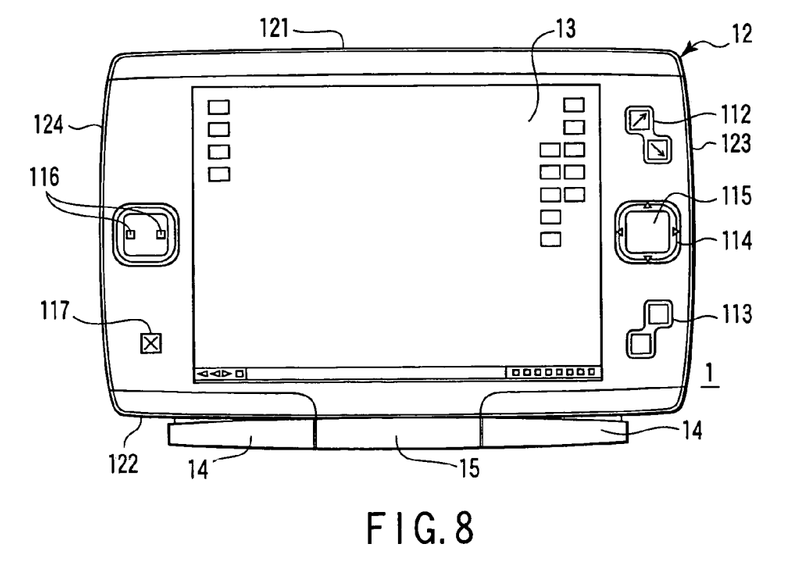
FIG. 8 is a top view of the information processing apparatus shown in FIG. 1, which turns 90 degrees to the left in a PDA style.

FIG. 8 illustrates the computer 1 in which the top-end portion 121 of the display unit main body is located above and the bottom-end portion 122 thereof is located below relative to the force of gravity. A screen image rotates 90 degrees to the right relative to the orientation of a default of the image in the PDA style such that the top-end portion of the screen image is located toward the top-end portion 121 of the display unit main body and the bottom-end portion of the screen image is located toward the bottom-end portion 122 of the display unit main body. The screen image is displayed in the aspect ratio (e.g., length width=3:4) corresponding to the horizontally oriented screen.

While the computer 1 is operating in the PDA style, the automatic image rotating function is performed to sense which of the orientations shown in FIGS. 5 to 8 the computer 1 is located in relative to the force of the gravity and automatically change the orientation of an image such that it can correctly be aligned with that of the force of gravity in accordance with the results of the sensing.

The way to detect which of the PC style and the PDA style corresponds to the present style of the computer 1 will be described with reference to FIG. 9.

Figure 9:
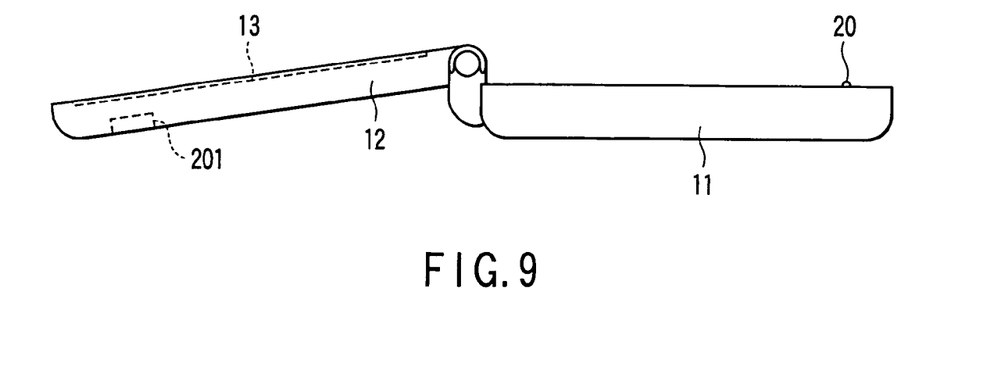
FIG. 9 is a sketch of a PDA-style sensing switch provided in the display unit of the information processing apparatus shown in FIG. 1.

FIG. 9 illustrates the display unit 12 that opens 180 degrees or more from the top surface of the computer main body 11 with regard to the first central axis 15a. The display unit 12 has a PDA style sensing switch 201 on its rear surface. The PDA style sensing switch 201 is a mechanical switch for detecting which of the PC style and the PDA style corresponds to the present style of the computer 1. When the rear surface of the display unit 12 is placed on the top surface of the computer main body 11, the PDA style sensing switch 201 contacts a projection 20 formed on the top surface of the computer main body 11 and thus turns on. When the switch 201 turns on, it outputs a sensing signal of logic level "1" indicating that the present style of the computer 1 is a PDA style. When the switch 201 turns off, it outputs a sensing signal of logic level "0" indicating that the present style of the computer 1 is a PC style.

Figure 10:
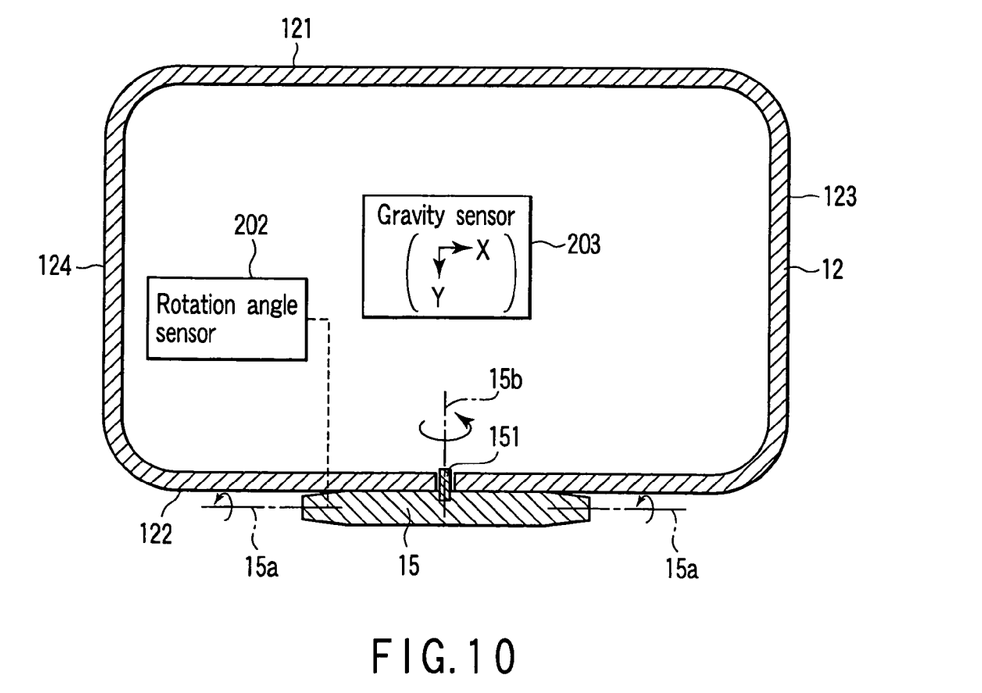
FIG. 10 is a sketch of two sensors provided in the display unit of the information processing apparatus shown in FIG. 1.

Referring to FIG. 10, the main body of the display unit 12 is supported by the support member 15 such that it can be rotated on the second central axis 15b by a shaft 151 protruded from the support member 15. The display unit main body contains a rotation angle sensor 202 and a gravity sensor 203. The rotation angle sensor 202 senses whether an angle formed between the front surface of the display unit 12 and the top surface of the computer main body 11 is greater than a specific angle by the rotation angle of the support member 15 that rotates around the first central axis 15a. For example, the sensor 202 senses whether or not the angle is 180 degrees or greater. The sensor 202 can be provided in the computer main body 11. Also, the sensor 202 can be replaced with a mechanical switch that is turned on by a projection formed on the support member 15 when the display unit 12 rotates on the first central axis 15a and opens 180 degrees or more from the top surface of the computer main body 11.

The gravity sensor 203 is a sensor for sensing which orientation the display unit main body is located in relative to the orientation of the force of gravity. For example, the sensor 203 is implemented as a gradient sensor for sensing the gradient of the display unit main body in two-dimensional directions X and Y. The gravity sensor 203 senses the gradient in the direction X to output a sensing signal (X) indicative of which of the right-end portion 123 and left-end portion 124 of the display unit 12 is located below relative to the force of gravity. The gravity sensor 203 senses the gradient in the direction Y to output a sensing signal (Y) indicative of which of the top-end portion 121 and bottom-end portion 122 of the display unit 12 is located below relative to the force of gravity. The gravity sensor 203 thus senses which of the orientations shown in FIGS. 5 to 8 the computer 1 is located in relative to the force of gravity.

The gravity sensor 203 can also sense whether or not an angle formed between the front surface of the display unit 12 and the top surface of the computer main body 11 is 180 degrees or greater. When the angle exceeds 180 degrees, the gravity sensor 203 senses that the top-end portion 121 of the display unit 12 is located lower than the bottom-end portion 122 thereof relative to the force of gravity.

A system configuration of the computer 1 will be described with reference to FIG. 13.

Figure 13:
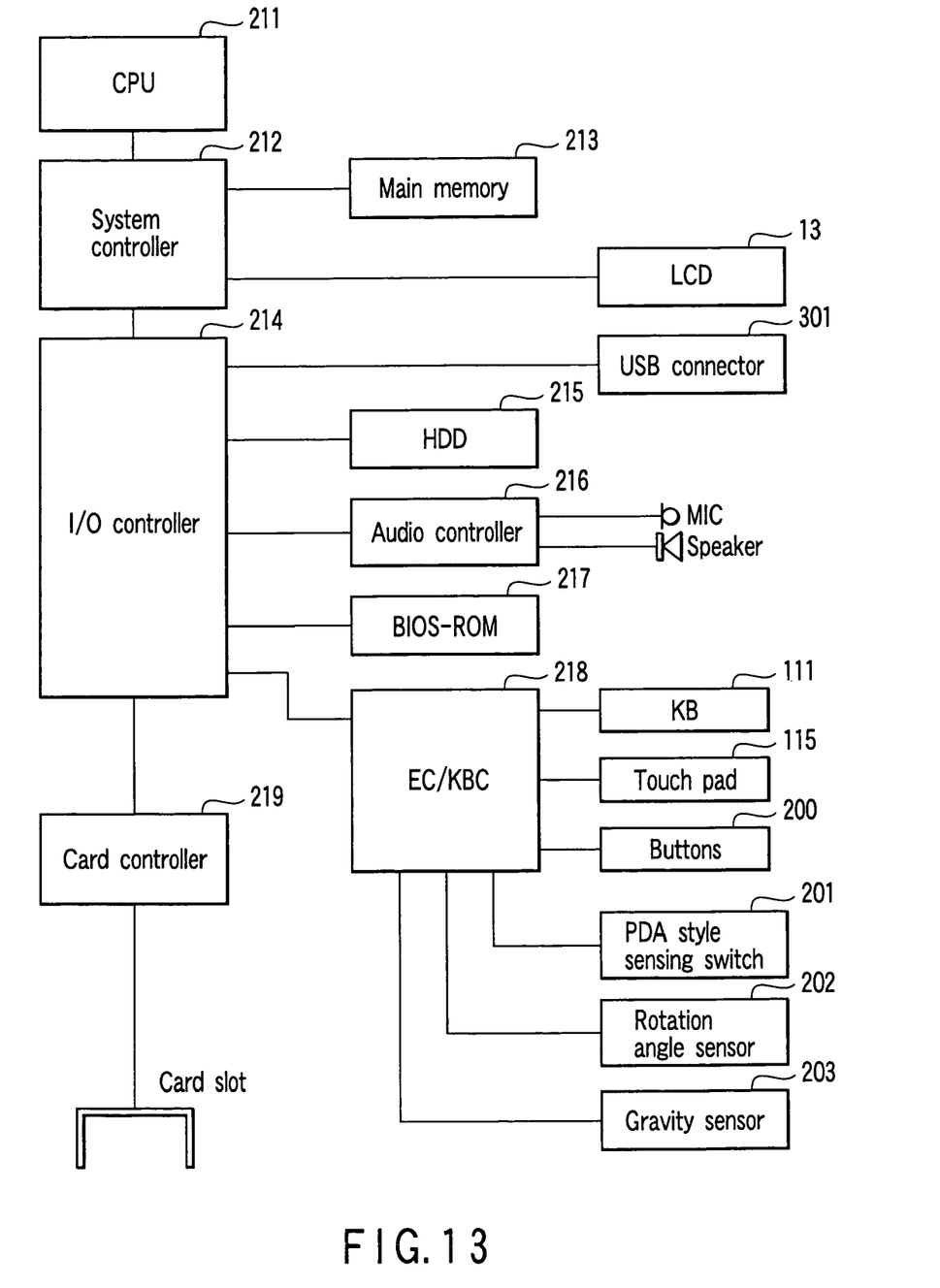
FIG. 13 is a block diagram showing a system configuration of the information processing apparatus shown in FIG. 1.

The computer main body 11 includes a CPU 211, a system controller 212, a main memory 213, an I/O controller 214, a hard disk drive (HDD) 215, an audio controller 216, a BIOS-ROM 217, an embedded controller/keyboard controller IC (EC/KBC) 218, and a card controller 219, as illustrated in FIG. 13.

The CPU 211 is a processor for controlling an operation of the computer 1 and executes various application programs and an operating system which are loaded into the main memory 213 from the HDD 215. The CPU 211 also executes a BIOS (Basic Input Output System) stored in the BIOS-ROM 217. The BIOS is a program for controlling hardware that makes up the computer 1. The BIOS has a function of controlling an automatic image rotating function.

The system controller 212 is a bridge device to connect the CPU 211 and I/O controller 214 and includes a memory controller for controlling the main memory 213 and a display controller for controlling the LCD 13. The I/O controller 214 performs communications with respective devices connected to the I/O controller 214 under the control of the CPU 211. The I/O controller 214 includes a USB (Universal Serial Bus) host controller. The USB host controller controls a USB device connected to a USB connector provided on the computer main body 11.

The audio controller 216 carries out a voice input operation for inputting a voice signal through a microphone and an audio playback operation for outputting an audio signal from a speaker under the control of the CPU 211. The EC/KBC 218 includes a one-chip microcomputer and is connected to the keyboard 111, touch pad 115 and button group 200 to sense their operations. The button group 200 includes the foregoing key switches 112, 113, 114, 116, 117, 118 and 119. The EC/KBC 218 is electrically connected to the PDA style sensing switch 201, rotation angle sensor 202 and gravity sensor 203.

Under the control of the CPU 211, the card controller 219 controls various cards such as a memory card and a communication card, which are inserted into a card slot provided in the computer main body 11.

Figure 14:
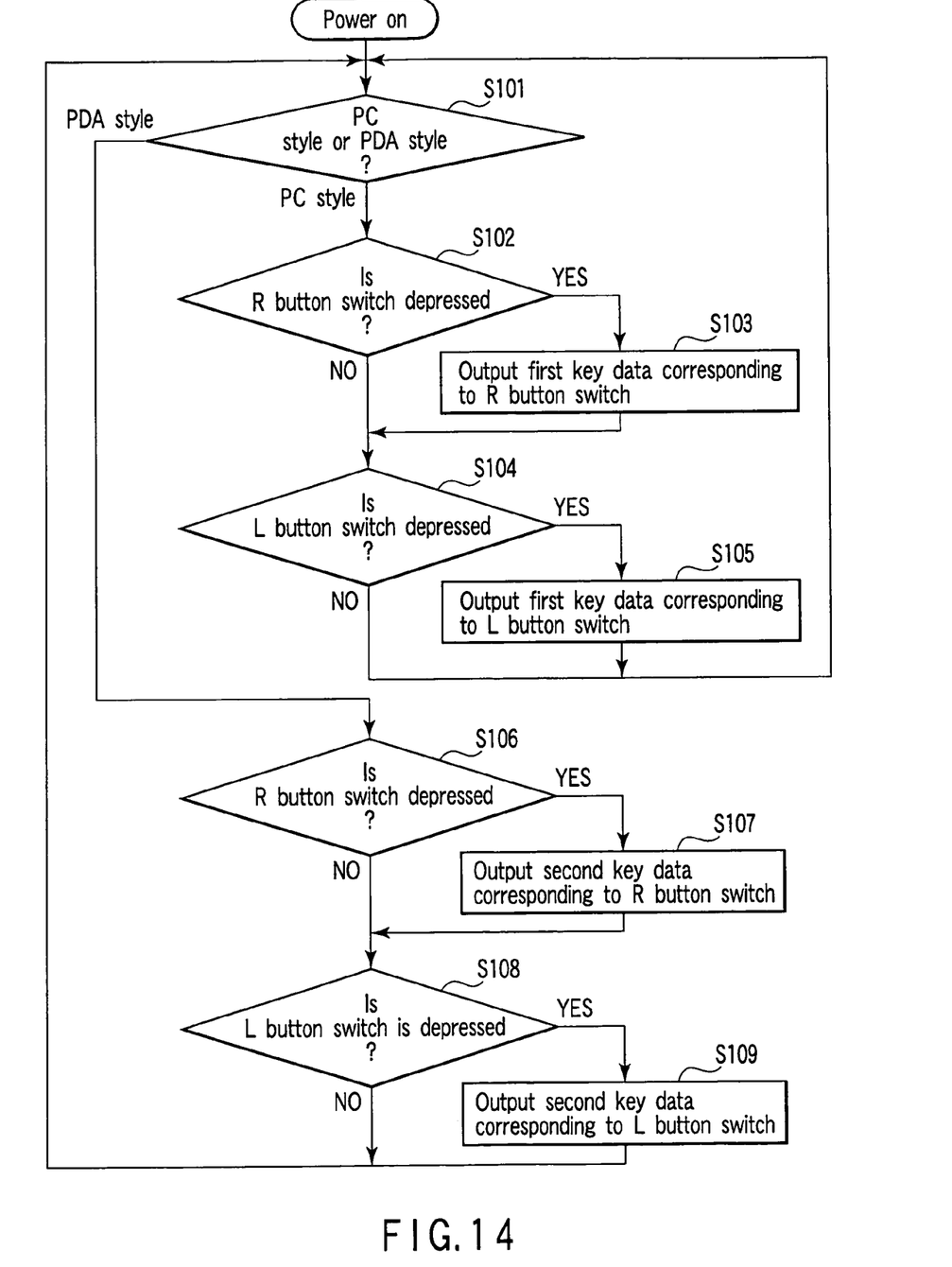
FIG. 14 is a flowchart showing an example of a procedure for a button control operation carried out by the information processing apparatus shown in FIG. 1.

A button control operation carried out by the EC/KBC 218 will be described with reference to the flowchart shown in FIG. 14.

While the computer 1 is powered on, the EC/KBC 218 supervises a sensing signal from the PDA style sensing switch 201. In response to a value of the sensing signal, the EC/KBC 218 determines whether the display unit 12 is located in the first open position or the second open position, or whether the computer 1 is used in the PC style or the PDA style (step S101).

If a value of the sensing signal from the PDA style sensing switch 201 is "0," the EC/KBC 218 determines that the display unit 12 is located in the first open position or the computer 1 is used in the PC style. If a user depresses the R button switch 118 in this condition (YES in step S102), the EC/KBC 218 supplies the CPU 211 with first key data (corresponding to a [Shift] key, a [↓] key, etc.) which is associated with the R button switch 118 in response to an event signal output from the R button switch 118 (step S103). This first key data associated with the switch 118 is key data that should be associated with the R button switch 118 while the computer 1 is used in the PC style, and the key data is set in the EC/KBC 218 in advance by the BIOS. If the user depresses the L button switch 119 (YES in step S104), the EC/KBC 218 supplies the CPU 211 with first key data (corresponding to a [Ctrl] key, a [↑] key, etc.) which is associated with the L button switch 119 in response to an event signal output from the L button switch 119 (step S104). This first key data associated with the switch 119 is key data that should be associated with the L button switch 119 while the computer 1 is used in the PC style, and the key data is set in the EC/KBC 218 in advance by the BIOS.

If a value of the sensing signal from the PDA style sensing switch 201 is "1," the EC/KBC 218 determines that the display unit 12 is located in the second open position or the computer 1 is used in the PDA style. If the user depresses the R button switch 118 in this condition (YES in step S106), the EC/KBC 218 supplies the CPU 211 with second key data (corresponding to a left button of the pointing device, an [Enter] key, etc.) which is associated with the R button switch 118 in response to an event signal output from the R button switch 118 (step S107). The second key data associated with the switch 118 is key data that should be associated with the R button switch 118 while the computer 1 is used in the PDA style, and the key data is set in the EC/KBC 218 in advance by the BIOS. If the user depresses the L button switch 119 (YES in step S108), the EC/KBC 218 supplies the CPU 211 with second key data (corresponding to a right button of the pointing device, an [Esc] key, etc.) which is associated with the L button switch 119 in response to an event signal output from the L button switch 119 (step S109). The second key data associated with the switch 119 is key data that should be associated with the L button switch 119 while the computer 1 is used in the PDA style, and the key data is set in the EC/KBC 218 in advance by the BIOS.

As described above, the function of each of the R and L button switches 118 and 119 is automatically varied according to whether the computer 1 is used in the PC style or the PDA style. Thus, the computer can be more improved in operability.

The same function can be assigned to both of the R and L button switches 118 and 119 regardless of whether the computer 1 is used in the PC style or the PDA style.

In the present embodiment, the R and L button switches 118 and 119 are arranged at their respective right and left end portions of the back of the computer main body 11 and separated from each other. A user can thus easily operate the R and L button switches 118 and 119 with both forefingers while gripping the computer main body 11 with both hands.

The R and L button switches 118 and 119 serve as auxiliary keys such as a [Shift] key and a [Ctrl] key. A user can thus easily input key data corresponding to alphabet keys and key data corresponding to the [Shift] key or [Ctrl] key at the same time even when the user performs a typing input operation while holding the computer with both hands.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information processing apparatus comprising:
    a housing that includes a first rectangular-shaped unit and a second rectangular-shaped unit, in which a rear end portion of the first rectangular-shaped unit and a rear end portion of the second rectangular-shaped unit are joined together;
    a touch screen device placed on a surface of the first rectangular-shaped unit and configured to recognize a position indicated by a stylus or a user's finger;
    a plurality of key switches arranged on both sides of the touch screen device, said plurality of key switches including:
        (a) four arrow keys indicating four directions representing up, down, right, and left directions, and
        (b) first and second push button switches serving as a cancel key and an enter key,
        wherein the four arrow keys being arranged on one side of the touch screen device and the first and second push button switches being arranged on an other side of the touch screen device;
    a system controller configured to change an orientation of a screen image displayed on the touch screen device between a first orientation in which a top-end portion and a bottom-end portion of the screen image are extended along a longitudinal direction of the first rectangular-shaped unit and a second orientation in which the top-end portion and the bottom-end portion of the screen image are extended along a direction orthogonal to the longitudinal direction;
    third and fourth push button switches provided at right and left side portions of a rear surface of the housing and configured to input first and second key data items, the rear surface being exposed regardless of whether the first rectangular-shaped unit and the second rectangular-shaped unit are set in a closed position in which a top surface of the second rectangular-shaped unit is covered by the first rectangular-shaped unit;
    a card slot;
    a card controller configured to control a card which is inserted into the card slot;
    a microphone configured to input a voice signal; and
    a speaker configured to output an audio signal.

2. The information processing apparatus according to claim 1, further comprising an I/O controller configured to control a Universal Serial Bus (USB) device.

* * * * *